Patented Aug. 12, 1947

2,425,326

UNITED STATES PATENT OFFICE 2,425,326

2-(P-AMINOBENZENESULFONAMIDO)-4-HYDROXY - 5,6,7,8 - TETRAHYDROQUINAZOLINE

James H. Hunter and Alan H. Nathan, Kalamazoo, Mich., assignors to The Upjohn Company, Kalamazoo, Mich., a corporation of Michigan No Drawing. Application August 28, 1944, Serial No. 551,625

1 Claim. (Cl. 260—239.6)

This invention relates to a new product, 2-(p-aminobenzene sulfonamido)-4-hydroxy - 5,6,7,8-tetrahydroquinazoline, having the formula:

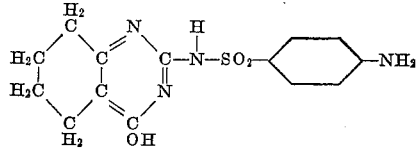

We have prepared 2-(p-aminobenzene sulfonamido)-4-hydroxy-5,6,7,8-tetrahydroquinazoline, determined certain of its physical properties whereby it may be identified readily, and found that it is useful for treatment of certain types of bacterial infections, such as those caused by pneumococci and streptococci.

Our new compound may be prepared readily and in high yield by reacting sulfaguanidine with an alkyl ester of 2-carboxy cyclohexanone in the presence of an alkali metal alcoholate, preferably sodium ethylate. The reaction may be carried out conveniently by dissolving metallic sodium in anhydrous ethanol, adding sulfaguanidine and 2-carbethoxy cyclohexanone to the solution, and refluxing the mixture for several hours, care being exercised to prevent access of moisture to the refluxing mixture. The alcohol may then be distilled from the reacted mixture, the residue dissolved in water, the solution filtered, the filtrate acidified, and the product recovered in substantially pure form by filtering and drying.

The sulfaguanidine and ester of 2-carboxy cyclohexanone are usually employed in approximately equi-molecular proportions. From about 1 to about 1.5 molecular proportions of sodium may be employed conveniently, although somewhat smaller or larger proportions may be used if desired. Sufficient alkanol is preferably employed to maintain the reactants and product in solution at the refluxing temperature. The reaction is substantially complete after from 1 to 5 hours refluxing. The crude 2-(p-aminobenzene sulfonamido)-4-hydroxy-5,6,7,8 - tetrahydroquinazoline may, if desired, be purified by recrystallizing from either dilute or glacial acetic acid, although such purification is not usually necessary.

2-(p-aminobenzene sulfonamido) - 4 - hydroxy- 5,6,7,8-tetrahydroquinazoline, when prepared and purified in the above manner, is a crystalline product melting at 257° to 257.5° centigrade. It is soluble to the extent of about 4.2 grams in 100 cubic centimeters of boiling glacial acetic acid and almost insoluble in water, benzene, ether, and chloroform.

The following example is given by way of illustration, but is not to be construed as limiting:

Three and four-tenths grams of sodium was dissolved in 60 cubic centimeters of absolute ethanol and to the resulting solution there was added 21.4 grams of sulfaguanidine and 17 grams of 2-carbethoxy cyclohexanone. The mixture was heated to boiling on the steam bath under a reflux condenser protected against atmospheric moisture for 5 hours. The alcohol was then removed by distillation from the steam bath and the residue dissolved in water, the solution filtered, and the filtrate acidified with glacial acetic acid. 2-(p-aminobenzene sulfonamido)-4-5,6,7,8-tetrahydroquinazoline precipitated immediately upon acidification in the form of a white gummy substance which hardened rapidly. After thorough washing with water and drying it melted at 257–257.5° centigrade. The following values were obtained upon analyzing the product:

Calcd. for $C_{14}H_{16}N_4O_3S$: C, 52.54; H, 5.04; N, 17.51. Found: C, 52,40; H, 5.46; N, 17.51.

We claim:

2-(p-aminobenzene sulfonamido) - 4 - hydroxy-5,6,7,8-tetrahydroquinazoline.

JAMES H. HUNTER.
ALAN H. NATHAN.

REFERENCES CITED

The following references are of record in the file of this patent:

FOREIGN PATENTS

| Number | Country | Date |
|---|---|---|
| 548,422 | British | Oct. 9, 1942 |

OTHER REFERENCES

Indian Academy of Sciences, vol. 16a, Aug. 1942, pages 115–125.

Journal Amer. Chem. Soc., vol. 63, Aug. 1941, pages 2188–2190.